UNITED STATES PATENT OFFICE.

ALEXANDER CUTLER, OF MALDEN, MASSACHUSETTS, ASSIGNOR TO CHARLES H. HAYWARD, OF SAME PLACE.

IMPROVED PROCESS OF VULCANIZING INDIA-RUBBER IN CONNECTION WITH LEATHER.

Specification forming part of Letters Patent No. 56,670, dated July 24, 1866.

*To all whom it may concern:*

Be it known that I, ALEXANDER CUTLER, of Malden, in the county of Middlesex and State of Massachusetts, have made a new and useful invention respecting the Vulcanizing of India-Rubber or Caoutchouc connected with Leather, without burning of or injury to the latter; and I do hereby declare the said process to be described as follows:

By the common and well-known means or process of heating articles composed in whole or in part of india-rubber and sulphur for the purpose of vulcanizing them, articles composed of leather and the india-rubber composition cannot be vulcanized without burning or injuring the leather, the great heat and the close chamber employed to effect the vulcanizing being destructive of or seriously injurious to the leather.

I have discovered that by passing through the vulcanizing furnace or chamber, while rubber connected with leather is in the act of being vulcanized, a sufficient current or body of air, and allowing the same to circulate freely about and upon the goods, the vulcanizing of the rubber composition can be effected without injury to the leather. Thus, in making shoes having their uppers composed in whole or in part of leather and their other parts of rubber, I am enabled to completely vulcanize the rubber without curling, burning, or injuring the leather, even when the heat for the vulcanizing process be as high as 280° Fahrenheit.

I am aware that it is not new to allow a small amount of air to circulate through the vulcanizing-chamber for the purpose of removing the vapors or gases resulting from heating the composition of sulphur and rubber; but the amount of air so employed and suffered to escape has always been too small to prevent the heat from doing injury to the leather. I have found that by using a much larger amount of air the leather, being a better conductor of heat than the rubber, will not be affected or burned by the heat, while the rubber will absorb and retain all the heat necessary to its vulcanization.

I do not pretend to give the *rationale* of the process; but I know and state the result of the free use of air.

In carrying out my process I generally employ to the vulcanizing-chamber an air-inlet of at least double the capacity of that usually used. I have found that one over three times the usual size is preferable.

My invention is one of great utility, as by means of it many articles can be made of rubber and leather which it has been supposed heretofore could not be so made on account of destroying or injuring the leather during vulcanization of the rubber.

I claim—

The improved process of treating leather and rubber during the vulcanizing of the latter, such consisting in the employment of air in the vulcanizing chamber or furnace in sufficient quantity to prevent the heat thereof from injuring the leather without materially impairing its vulcanizing effect on the composition of rubber and sulphur.

ALEXANDER CUTLER.

Witnesses:
R. H. EDDY,
C. H. HAYWARD.